(12) United States Patent
Hundemer

(10) Patent No.: US 10,321,176 B1
(45) Date of Patent: *Jun. 11, 2019

(54) SYSTEM AND METHOD FOR RETRIEVING ONE OF MULTIPLE MEDIA-COMPONENTS ASSOCIATED WITH A SINGLE BROADCASTING TRAFFIC LOG ENTRY

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 106 days.

This patent is subject to a terminal disclaimer.

(21) Appl. No.: 14/493,627

(22) Filed: Sep. 23, 2014

Related U.S. Application Data

(63) Continuation of application No. 13/629,485, filed on Sep. 27, 2012, now Pat. No. 8,875,174.

(60) Provisional application No. 61/542,103, filed on Sep. 30, 2011.

(51) Int. Cl.
| | | |
|---|---|---|
| *H04N 7/10* | (2006.01) | |
| *H04N 21/262* | (2011.01) | |
| *H04N 21/232* | (2011.01) | |
| *H04N 21/435* | (2011.01) | |

(52) U.S. Cl.
CPC ......... *H04N 21/262* (2013.01); *H04N 21/232* (2013.01); *H04N 21/435* (2013.01)

(58) Field of Classification Search
CPC ............... H04N 21/232; H04N 21/262; H04N 21/2393; H04N 21/26233; H04N 21/26241; H04N 21/26258; H04N 21/26283; H04N 21/435; H04N 21/472; H04N 21/854; H04H 20/71; H04H 60/06
USPC ............................................... 725/32, 34–36
See application file for complete search history.

(56) References Cited

U.S. PATENT DOCUMENTS

| | | | | |
|---|---|---|---|---|
| 8,875,174 | B1 * | 10/2014 | Hundemer | 725/32 |
| 2002/0038455 | A1 * | 3/2002 | Srinivasan | G06Q 30/02 725/35 |
| 2002/0083443 | A1 * | 6/2002 | Eldering | G06Q 30/02 725/34 |
| 2003/0110171 | A1 * | 6/2003 | Ozer | G06Q 30/02 |

(Continued)

*Primary Examiner* — Farzana Hossain
(74) *Attorney, Agent, or Firm* — McDonnell Boehnen Hulbert & Berghoff, LLP

(57) ABSTRACT

Disclosed herein is a system and method for retrieving one of multiple media-components associated with a single traffic log entry. In one example, a method for retrieving a video-component (VC) in a television-broadcasting environment is disclosed. The method includes (i) associating an identifier with an evergreen VC, a time-sensitive VC, and an expiration time of the time-sensitive VC; (ii) determining whether the expiration time has lapsed; (iii) if the expiration time has lapsed, determining that the identifier corresponds to the evergreen VC; (iv) if the expiration time has not lapsed, determining that the identifier corresponds to the time-sensitive VC; (v) selecting a log entry; (vi) determining that the selected entry includes the identifier; and (vii) responsive to determining that the selected entry includes the identifier, retrieving from a data storage, the one of the evergreen VC and the time-sensitive VC that the identifier corresponds to.

20 Claims, 8 Drawing Sheets

(56) References Cited

U.S. PATENT DOCUMENTS

| | | | | |
|---|---|---|---|---|
| 2007/0162927 A1* | 7/2007 | Ramaswamy | ......... | G11B 27/28 |
| | | | | 725/36 |
| 2008/0059997 A1* | 3/2008 | Plotnick | ............... | G11B 27/005 |
| | | | | 725/32 |
| 2010/0153994 A1* | 6/2010 | Alexander | ............. | H04N 7/163 |
| | | | | 725/35 |
| 2010/0269134 A1* | 10/2010 | Storan | .................... | G06Q 30/02 |
| | | | | 725/34 |
| 2013/0216207 A1* | 8/2013 | Berry | ....................... | H04N 5/76 |
| | | | | 386/282 |

\* cited by examiner

SYSTEM AND METHOD FOR RETRIEVING ONE OF MULTIPLE MEDIA-COMPONENTS ASSOCIATED WITH A SINGLE BROADCASTING TRAFFIC LOG ENTRY

CROSS REFERENCE TO RELATED APPLICATIONS

This disclosure is a continuation of U.S. patent application Ser. No. 13/629,485, entitled "System and Method for Retrieving One of Multiple Media-Components Associated With A Single Broadcasting Traffic Log Entry," filed on Sep. 27, 2012, which claims priority to U.S. Provisional Pat. App. No. 61/542,103, entitled "System and Method for a Master Controller," filed on Sep. 30, 2011, all of which are hereby incorporated by reference herein in their entirety.

USAGE AND TERMINOLOGY

Throughout this application, with respect to all reasonable derivatives of such terms, and unless otherwise specified (and/or unless the particular context clearly dictates otherwise), each usage of:

"a" or "an" is meant to read as "at least one."
"the" is meant to be read as "the at least one."
the term "video" refers broadly to any material represented in a video format (i.e., having a plurality of frames). In some instances, video may include a plurality of sequential frames that are identical or nearly identical, and that may give the impression of a "still" image. Video may or may not include an audio portion.
the term "audio" refers broadly to any material represented in an audio format.
The term "media-component" (MC) refers to video or audio that one of ordinary skill in the art would typically consider to be self-contained, and that is typically separately scheduled by a traffic system in a broadcasting environment.
the term "video-component" (VC) refers to a particular type of MC, namely one that includes video, and that is typically separately scheduled by a traffic system in a television-broadcasting environment. There are several types of VCs, including, for example, a show-segment VC, such as a six-minute segment of a news program or a five-minute segment of an episode of a sitcom. Another example type of VC is a commercial VC, such as a thirty-second advertisement for a product. Yet another example type of VC is a promotion VC, such as a fifteen-second promotion for a news program.
The term "audio-component" (AC) refers to a particular type of MC, namely one that contains audio, and that is typically separately scheduled by a scheduling traffic system in a radio-broadcasting environment. Similar to a VC, there are several types of ACs, including for example a show-segment AC, such as a six-minute segment of a news program. Another example type of AC is a commercial AC, such as a thirty-second advertisement for a product. Yet another example type of AC is a promotion AC, such as a fifteen-second promotion for a news program.

TECHNICAL FIELD

The presently disclosed system and method relates to broadcasting technology, including for example, television-broadcasting and radio-broadcasting technology.

BACKGROUND

In the field of television broadcasting, traffic systems are software and/or hardware packages that may be used, among other things, to schedule and sequence VCs intended for broadcast (e.g., over the air). To schedule VCs, a traffic manager may interact with the traffic system to create a traffic log ("log"). A log may indicate which VCs are intended to be broadcast during a particular time span, and further may indicate when each VC is intended to be broadcast. A log may include multiple log entries, with each log entry corresponding to one VC and scheduling data for that VC. The log therefore may represent the sequence of VCs intended to be broadcast during the time span.

A traffic system typically communicates with a master control system (MCS), which is the technical hub of a broadcast operation and is the final point before a VC is sent to an air-chain system for broadcast. More specifically, the traffic system typically communicates with an automation system (AS) of the MCS. The AS is the logic center of the MCS and may cause the MCS and/or another entity to perform various functions. Through a communication path, the traffic system may provide the log to the AS, such that the AS may traverse and select log entries according to their corresponding scheduling data. The AS may then cause the MCS and/or another entity to perform certain functions corresponding to each selected log entry. Such functions typically include the MCS retrieving from a data storage the VC corresponding to the log entry, channeling the VC through one or more entities within the MCS (e.g., through one or more switches), and sending the VC to an air-chain system for broadcast.

SUMMARY

In one aspect, a method for retrieving a MC in a broadcasting environment involves: (i) associating an identifier with an evergreen MC, a time-sensitive MC, and an expiration time of the time-sensitive MC; (ii) determining whether the expiration time has lapsed; (iii) if it is determined that the expiration time has lapsed, determining that the identifier corresponds to the evergreen MC; (iv) if it is determined that the expiration time has not lapsed, determining that the identifier corresponds to the time-sensitive MC; (v) selecting a log entry from a broadcast traffic-log; (vi) determining that the selected log entry includes the identifier; (vii) responsive to determining that the selected log entry includes the identifier, retrieving from a data storage, the one of the evergreen MC and the time-sensitive MC that the identifier corresponds to; and (viii) sending the retrieved MC to an air-chain system for broadcast.

In another aspect, a non-transitory computer-readable medium containing instructions that, when executed by a processor, cause performance of a set of functions for retrieving a VC in a television-broadcasting environment is disclosed. The set includes: (i) associating an identifier with an evergreen VC, a time-sensitive VC, and an expiration time of the time-sensitive VC; (ii) determining whether the expiration time has lapsed; (iii) if it is determined that the expiration time has lapsed, determining that the identifier corresponds to the evergreen VC; (iv) if it is determined that the expiration time has not lapsed, determining that the identifier corresponds to the time-sensitive VC; (v) selecting a log entry from a television-broadcast traffic-log; (vi) determining that the selected log entry includes the identifier; (vii) responsive to determining that the selected log entry includes the identifier, retrieving from a data storage, the one of the evergreen VC and the time-sensitive VC that the identifier corresponds to; and (viii) sending the retrieved VC to an air-chain system for television broadcast.

In another aspect, a non-transitory computer-readable medium containing instructions that, when executed by a processor, cause performance of a set of functions for retrieving a VC in a television-broadcasting environment. The set includes: (i) creating a record including an identifier, an evergreen reference that maps to an evergreen VC, and an active reference that maps to a time-sensitive VC associated with an expiration time; (ii) determining whether the expiration time has lapsed; (iii) responsive to determining that the expiration time has lapsed, overwriting the active reference with the evergreen reference; (iv) selecting a log entry from a television-broadcasting traffic-log; (v) determining that the selected log entry includes the identifier that is included in the record; (vi) responsive to determining that the selected log entry includes the identifier that is included in the record, retrieving from a data storage, the VC mapped to by the active reference included in the record; and (vii) sending the retrieved VC to an air-chain station for television broadcast.

In another aspect, a non-transitory computer-readable medium containing instructions that, when executed by a processor, cause performance of a set of functions for retrieving a video component (MC) in a broadcasting environment is disclosed. The set includes: (i) associating an identifier with a first time-sensitive MC, a second time-sensitive MC, and an expiration time of the second time-sensitive MC; (ii) determining whether the expiration time has lapsed; (iii) if it is determined that the expiration time has lapsed, determining that the identifier corresponds to the first time-sensitive MC; (iv) if it is determined that the expiration time has not lapsed, determining that the identifier corresponds to the second time-sensitive MC; (v) selecting a log entry from a television-broadcast traffic-log; (vi) determining that the selected log entry includes the identifier; (vii) responsive to determining that the selected log entry includes the identifier, retrieving from a data storage, the one of the first time-sensitive MC and the second time-sensitive MC that the identifier corresponds to; and (viii) sending the retrieved MC to an air-chain system for broadcast.

DETAILED DESCRIPTION OF THE DRAWINGS

I. Overview

Figure 1:
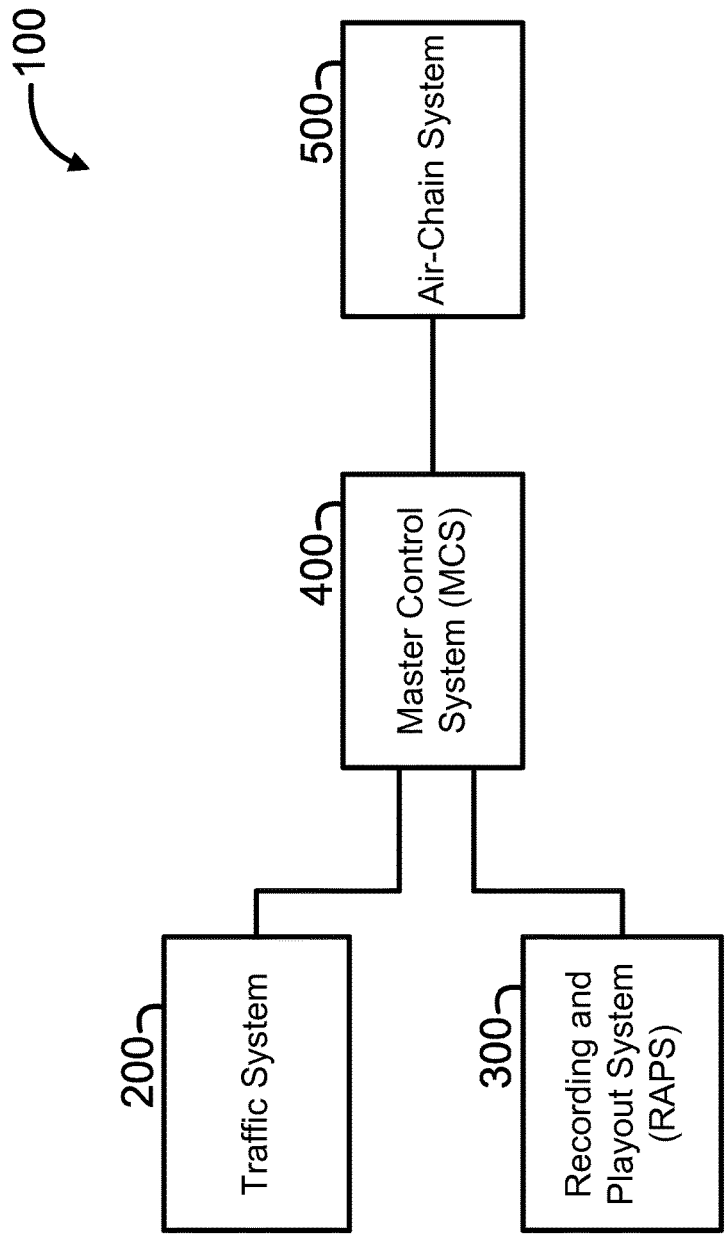
FIG. 1 is a simplified block diagram of an example television-broadcast system.

In the television-broadcasting industry, traffic systems are provided by multiple vendors and often include distinguishing features. However, for a variety of reasons such as to provide compatibility, many traffic systems create logs according to a general industry-wide standard. Likewise, many ASs are configured to receive logs based on this standard. A log entry based on this standard typically includes certain attributes. These attributes may be generated automatically (e.g., by the traffic system) or may be provided by a traffic manager.

One such attribute is a house number, which identifies the VC that corresponds to the log entry. Typically, the house number is a unique identifier within a broadcasting system, and maps to a file location in a data storage where the VC is stored. As such, by obtaining the house number, the AS may use a mapping table to determine the corresponding file location, and may then retrieve the VC stored in that file location. Two examples of well-known traffic systems that use house numbers in this manner include WO Traffic provided by WideOrbit Inc. of San Francisco, Calif., and OSi-Traffic™ provided by Harris Corporation of Melbourne, Fla.

Additional common attributes based on this standard include those relating to scheduling data. For example, a log entry may have a start time that represents the intended start time for the corresponding VC, and a duration that represents the duration of the corresponding VC. Other common attributes may include, for example, a title that provides a description of the VC.

Still additional common attributes based on this standard include an episode number, a segment number, and one or more auxiliary values. The episode number identifies a particular episode of a show, and is included in a log entry that corresponds to a show-segment VC. The segment number identifies a particular segment number of a show, and is included in a log entry that corresponds to a show-segment VC. The one or more auxiliary values may be used for notes (e.g., such that a traffic manager may provide a note to a master control operator about the corresponding log entry).

The above-described attributes are stored within corresponding fields in the log entry. For example, the house number is stored in a house-number field in the log entry. Likewise, the one or more auxiliary values are stored in one or more auxiliary-value fields in the log entry.

A log typically spans a twenty-four hour period and is often referred to as "daily" log, although the log often does not align with one calendar date. Instead, a log typically spans from 5:00 am EST of one date to 5:00 am EST of the next date. Accordingly, a "Mar. 6, 2012 log" may span from 5:00 am EST on Tuesday, Mar. 6, 2012, to 5:00 am EST on Wednesday, Mar. 7, 2012.

Due to the nature of television-broadcast schedules, for a given television station, logs for different dates but for the same day (i.e., the same day of the week) are often very similar. Indeed, from one Tuesday to another Tuesday, a television station often has the same lineup of shows and the same general scheduling layout. For this reason, traffic managers often copy a previous (e.g., one-week-old) log and use it as a starting point for a current log. However, while the current log is likely to have the same general scheduling layout as the previous log, typically the traffic manager still needs to modify the current log. For example, the traffic manager may modify house numbers of log entries for show-segment VCs such that they map to the current week's VCs. Likewise, the traffic manager may modify the episode number of log entries for show-segment VCs, which likely changed from the previous week.

In the context of creating a log, a promotion VC may be handled in a different manner from show-segment VCs. A promotion VC promotes one or more other VCs. For example, a promotion VC may be a fifteen-second clip that promotes a news program that is airing later that day. Due to the dynamic and often "last-minute" nature of producing a news program, a newsroom producer often creates a promotion VC corresponding to the news program shortly before the promotion VC is intended to air, and in some cases, even mere hours or minutes before the intended air-time. Notably, these newsroom producers typically have little or no interaction with traffic managers who create the logs.

For at least the reasons discussed above in connection with promotion VCs, a log entry that corresponds to a promotion VC typically has a static house number that remains unchanged from one log to another of the same day. As such, rather than the traffic manager having to repeatedly change the corresponding house number, the newsroom producer may simply overwrite the previous promotion-VC in the file location that the house number maps to, with a current promotion-VC. This technique provides a particular advantage in that the traffic manager may finalize the log before the newsroom producer has even created the current promotion-VC.

While the overwriting technique discussed above may provide one or more advantages, it may also cause undesired results. In particular, if a newsroom producer fails to overwrite the previous promotion-VC with a current promotion-VC, the previous promotion-VC may be broadcast. This may be undesired as the previous promotion-VC may promote a VC that has already been broadcast. For example, a promotion VC may be broadcast that promotes a news program that itself was broadcast the week before. This may confuse viewers and/or make the broadcasting company appear disorganized. Notably, this undesired result may occur with substantial frequency given that a single log typically schedules approximately twenty to thirty promotion VCs.

In one aspect of the presently disclosed system and method, an identifier included in a log entry is associated with multiple VCs, namely an evergreen VC and a time-sensitive VC. The identifier is also associated with an expiration time of the time-sensitive VC. In one example, the identifier is included in a house-number field of the log entry (such that it replaces a traditional house number).

As used in connection with a VC, the term "evergreen" is known to those of ordinary skill in the art and refers to a VC that is not time-sensitive. As such, an evergreen VC would not promote or advertise a VC or a scheduled event. As an example, an evergreen VC may be a general promotion or advertisement for the television station itself (e.g., "watch channel 2 for news, sports, weather, and the best shows on television").

A time-sensitive VC is different from an evergreen VC in that the former is time-sensitive, and more specifically, is intended to be broadcast before a specified time. One example of a time-sensitive VC is a promotion VC as described above. As such, a time-sensitive VC may be a news promotion for a news program that starts at 9:00 PM EST on Mar. 6, 2012 and ends at 10:00 PM EST on the same date. In this example, the news promotion may be intended to air before the start time of the news program, and almost certainly before the end time of the news program. Indeed, as discussed above, if the news promotion airs after the news program, viewers may be confused and/or the broadcasting company may appear disorganized as the news promotion would promote a news program that has already aired. Accordingly, in one example, the expiration time of the time-sensitive VC represents the last possible time that the time-sensitive VC should logically be broadcast. Notably, a time-sensitive VC does not necessarily need to promote another VC, but may instead be a VC that is otherwise time-sensitive. For example, a time-sensitive VC may simply refer to a particular upcoming event (e.g., an election or sporting event).

Based on a determination of whether the expiration time has lapsed, an AS may determine whether the identifier corresponds to the evergreen VC or to the time-sensitive VC, such that the AS may cause an appropriate VC to be retrieved. Indeed, if the expiration time has lapsed, the evergreen VC may be retrieved. This addresses the potential undesired result discussed above, where a producer fails to overwrite the previous promotion-VC with a current promotion-VC. Alternatively, if the expiration time has not lapsed, and therefore the time-sensitive VC is deemed appropriate for use, the time-sensitive VC may be retrieved. Then, once the appropriate evergreen VC or time-sensitive VC is retrieved, the retrieved VC may be channeled through the MCS and sent to an air-chain system (e.g., including a transmitter) for broadcast.

In one example, by leveraging the house-number field of a log entry to provide the functionality described above, the presently disclosed system and method may be implemented in a system that includes or is configured for use with many existing traffic systems. This is particularly advantageous given the wide-spread use of house-number fields in traffic systems.

II. Example Television-Broadcasting System

FIG. 1 shows an example television-broadcasting system, generally designated 100. The television-broadcasting system 100 may include a traffic system 200, a recording-and-playout system (RAPS) 300, a MCS 400, and an air-chain system 500. The MCS 400 may serve as the hub of the television-broadcasting system 100 and may connect to each of the traffic system 200, the RAPS 300, and the air-chain system 500. Generally, the television-broadcasting system 100 may be configured such that video may be sent from the RAPS 300, through the MCS 400, and to the air-chain system 500 for television broadcast (e.g., over the air or over Internet Protocol (IP)).

A. Traffic System

Figure 2:
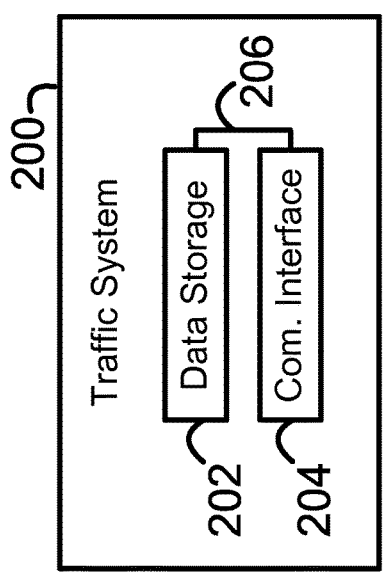
FIG. 2 is a simplified block diagram of an example traffic system.

FIG. 2 shows the traffic system 200 in greater detail. The traffic system 200 may be configured for creating and sending a traffic log to the MCS 300, and may include a data storage 202 and a communication interface 204, both of which may be connected to each other with a bus or other connection mechanism 206. The traffic system 200 may be configured to store traffic logs in the data storage 202, and to send the stored traffic logs, via the communication interface 204, to the MCS 300. As discussed above, two example traffic systems are WO Traffic provided by WideOrbit Inc. of San Francisco, Calif., and OSi-Traffic™ provided by Harris Corporation of Melbourne, Fla.

B. RAPS

Figure 3:
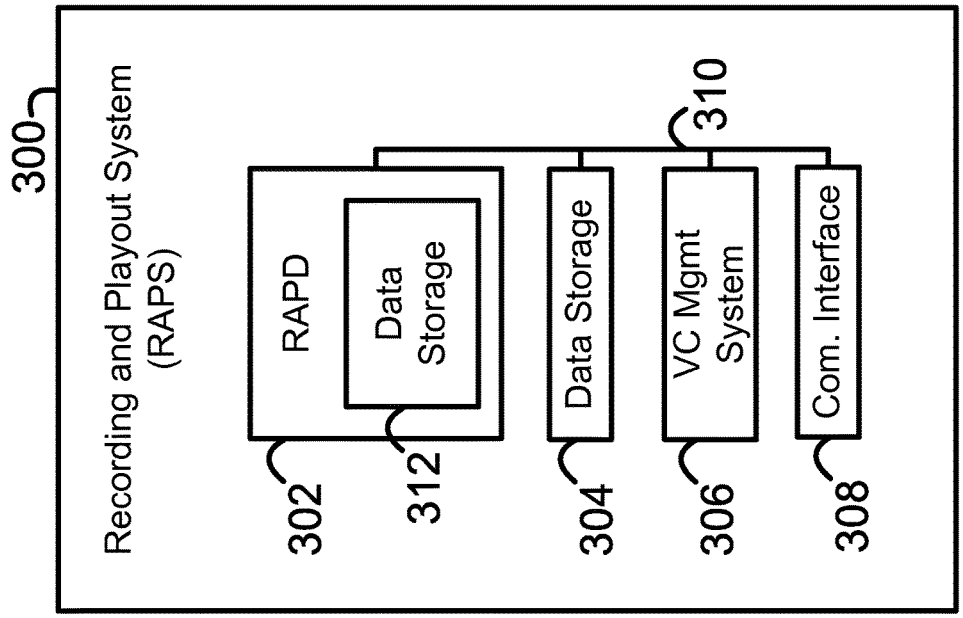
FIG. 3 is a simplified block diagram of an example recording-and-playout system.

FIG. 3 shows the RAPS 300 in greater detail. The RAPS 300 may be configured to record and playout VCs for use by the MCS 400, and may include a recording-and-playout device (RAPD) 302, a data storage 304, a VC management system 306, and a communication interface 308 each of which may be connected to each other via a bus or other connection mechanism 310.

The RAPD 302 may be configured to record VCs (e.g., a VC retrieved from the data storage 304) and to playout VCs that may be sent through the MCS 400 to the air-chain system 500 for television broadcast. The RAPD 302 may include a data storage 312 for storing VCs. An example of a RAPD is the K2 server provided by Grass Valley™ of San Francisco, Calif. The VC management system 306 may be configured to manage the RAPD 302 by organizing and moving VCs back-and-forth between the RAPD and the data storage 304. The communication interface 308 may connect the RAPS 300 to the MCS 400 or to another entity (device, system, etc.).

C. MCS

Figure 4:
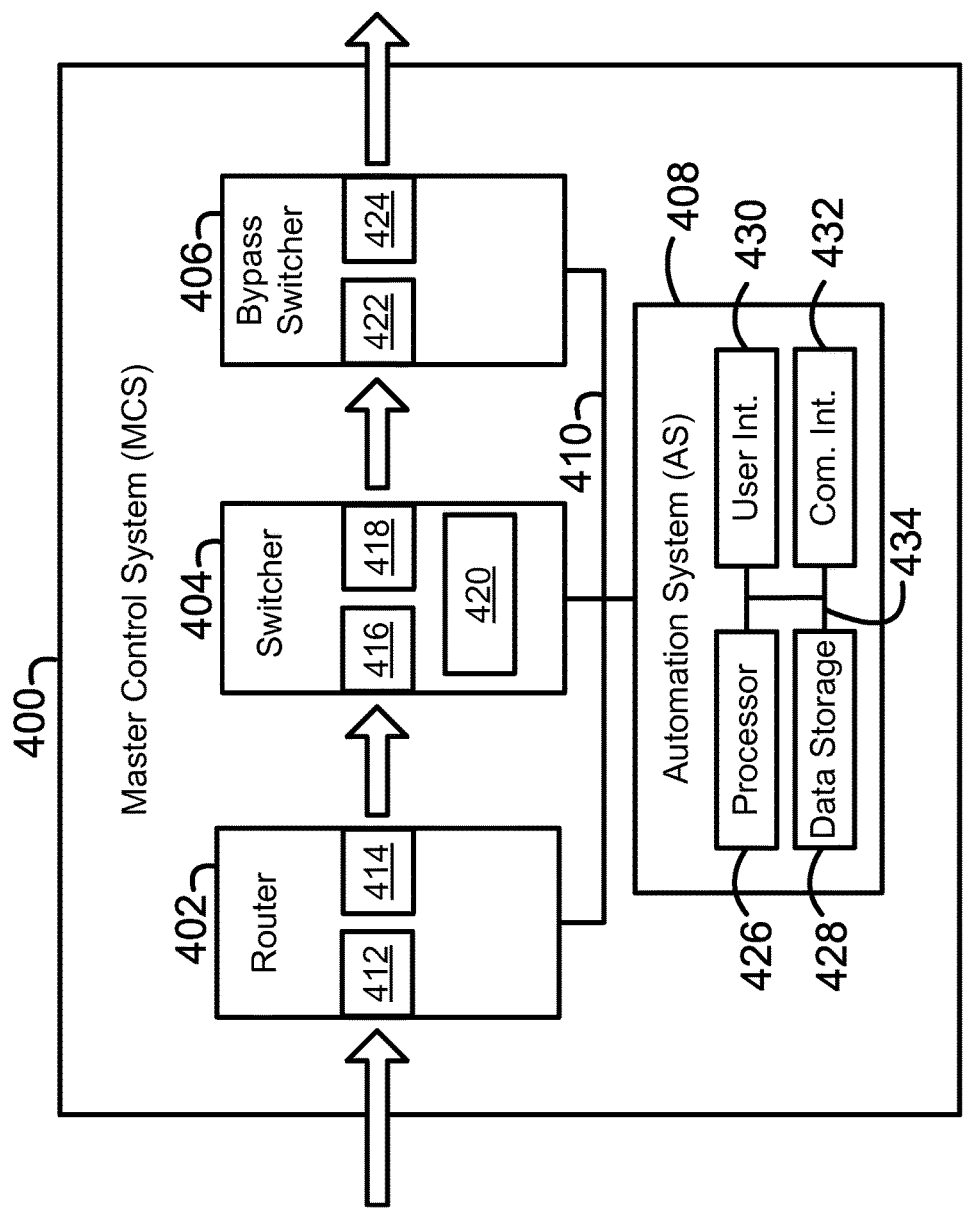
FIG. 4 is a simplified block diagram of an example master control system.

FIG. 4 shows the MCS 400 in greater detail. The MCS 400 may be configured to receive a VC being played-out of the RAPD 302, channel the VC though one or more entities, and send the VC to the air-chain system 500 for television broadcast. The MCS 400 may include a router 402, a stunt switcher 404, a bypass switcher 406, and an AS 408, all of which may be connected by a bus or other connection mechanism 410.

The router 402 may be configured to map a source entity to a destination entity, and may include one or more inputs 412 and one or more outputs 414. The one or more inputs 412 may be connected to a RAPD 302 or another source entity (e.g., a satellite or a newsroom production control system) and the one or more outputs 414 may be connected to the stunt switcher 404. An example of a router is the Blackmagic Design Videohub provided by Blackmagic Design Pty. Ltd. of Fremont, Calif.

The stunt switcher 404 may be configured to map a source entity to a destination entity, and may include one or more inputs 416 and one or more outputs 418. The one or more inputs 416 may be connected to the one or more outputs 414 of the router 402. The one or more outputs 418 may be connected to the bypass switcher 406. The stunt switcher 404 may also be configured to provide graphical overlay and other video effects (sometimes referred to as "stunt work" or "digital video effects") to the received VC before it is sent out. The stunt switcher 404 may include a data storage 420 for storing effect data. An example of a stunt switcher is the Miranda NVISION NVS5100MC provided by NVision, Inc. of Coppell, Tex.

The bypass switcher 406 may be configured to map a source entity to a destination entity, and may include one or more inputs 422 and one or more outputs 424. The one or more inputs 422 may be connected to the one or more outputs 418 of the stunt switcher 404. The one or more outputs 424 may be connected to the air-chain system 500. An example of a bypass switcher is the X-1202H switcher provided by Evertz Microsystems, Ltd. of Burlington, Ontario, Canada.

Accordingly, provided that the router 402, the stunt switcher 404, and the bypass switcher 406 all have the appropriate input-to-output mappings, a VC played-out by the RAPD 302 and sent to the MCS 400 may be channeled through the devices in the MCS and sent to the air-chain system 500 for broadcast.

The AS 408 may be configured to perform or to cause performance of one or more functions related to the television-broadcasting system 100. The AS 408 may include a processor 426, a data storage 428, a user-interface 430, and a communication interface 432, all of which may be connected by a bus or other connection mechanism 434. The processor 426 may include one or more general-purpose processors (e.g., microprocessors) and/or special-purpose processors (e.g., digital signal processors and/or application specific integrated circuits).

The data storage 428 may include one or more volatile and/or non-volatile storage components and may be integrated in whole or in part with the processor 426. The data storage 428 may take the form of a non-transitory computer-readable medium and may contain program instructions, that when executed by the processor 426, cause performance of one or more functions. For example, the AS 408 may cause the traffic system 200, the RAPS 300, the MCS 400, the air-chain system 500, and/or another entity to perform one of more of the functions described in this disclosure. The AS 408 may cause such functions to be performed by sending instructions and/or other data via a corresponding communication interface and/or connection mechanism. The AS 408 may receive data via the same path.

D. Air-Chain System

Figure 5:
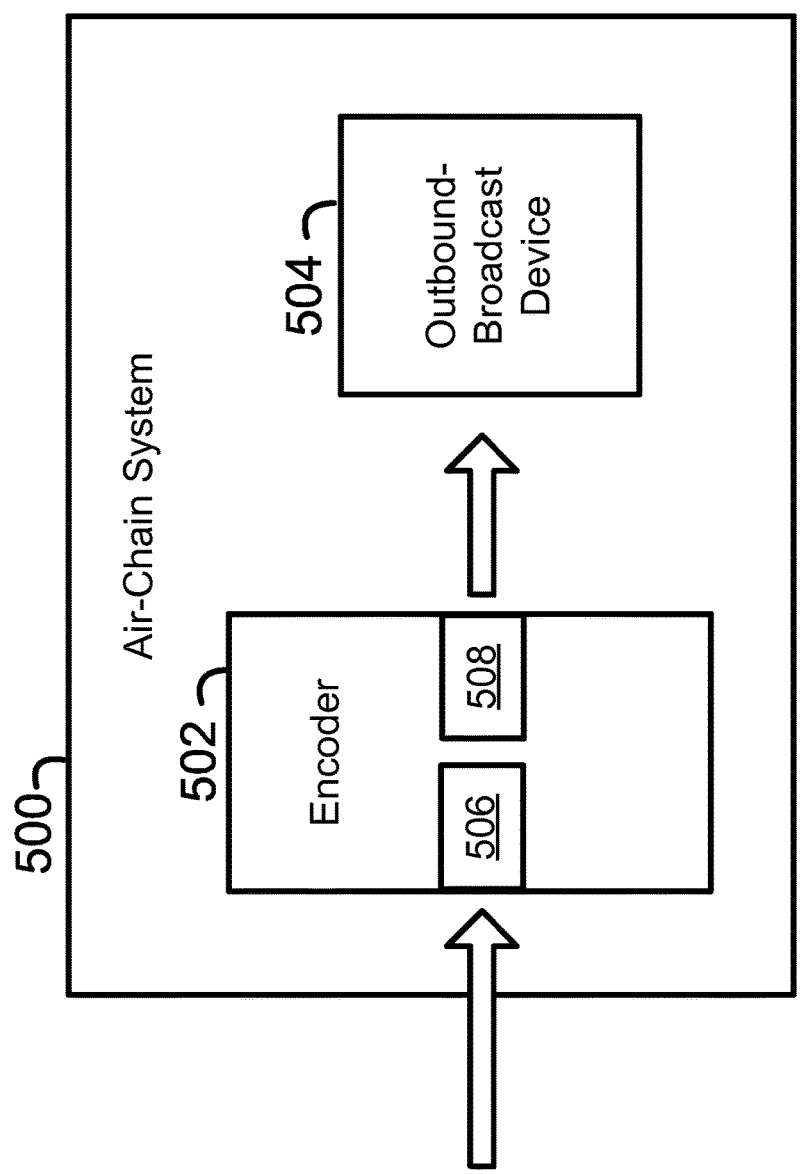
FIG. 5 is a simplified block diagram of an example air-chain system.

FIG. 5 shows the air-chain system 500 in greater detail. The air-chain system 500 may be configured to prepare and broadcast a VC received from the MCS 400 to multiple destination entities. The air-chain system 500 may include an encoder 502 and an outbound-broadcast device 504.

The encoder 502 may be configured to receive a VC from a source entity, encode the VC, and send the (encoded) VC to a destination entity. The encoder may include an input 506 and an output 508. The input 506 may be connected to the one or more outputs 424 of the bypass switcher 406, and the output 508 may be connected to the outbound-broadcast device 504. In one example, the encoder 502 may encode video based on the high-definition serial-digital-interface (HD-SDI) standard to video based on the MPEG 2 standard. An example of an encoder is the NetVX provided by Harris Corporation of Melbourne, Fla.

The outbound-broadcast device 504 may be configured to receive a VC from a source entity, and broadcast the VC to multiple destination entities. For example, the outbound-broadcast device 504 may be a transmitter, satellite, or network connection (e.g., for an Internet feed).

The television-broadcasting system 100 described above is one non-limiting example. Indeed, the presently disclosed system may include some or all of the entities discussed above, and may be arranged in different ways as would be apparent to one of ordinary skill in the art. As one example, in the MCS 400, the router 402 may connect directly to the bypass switcher 406 (i.e., omitting the stunt switcher 404). As another example, the data storage 304 and the VC management system 306 may be included in the MCS 400, rather than in the RAPS 300.

III. First Set of Example Methods

Figure 6A:
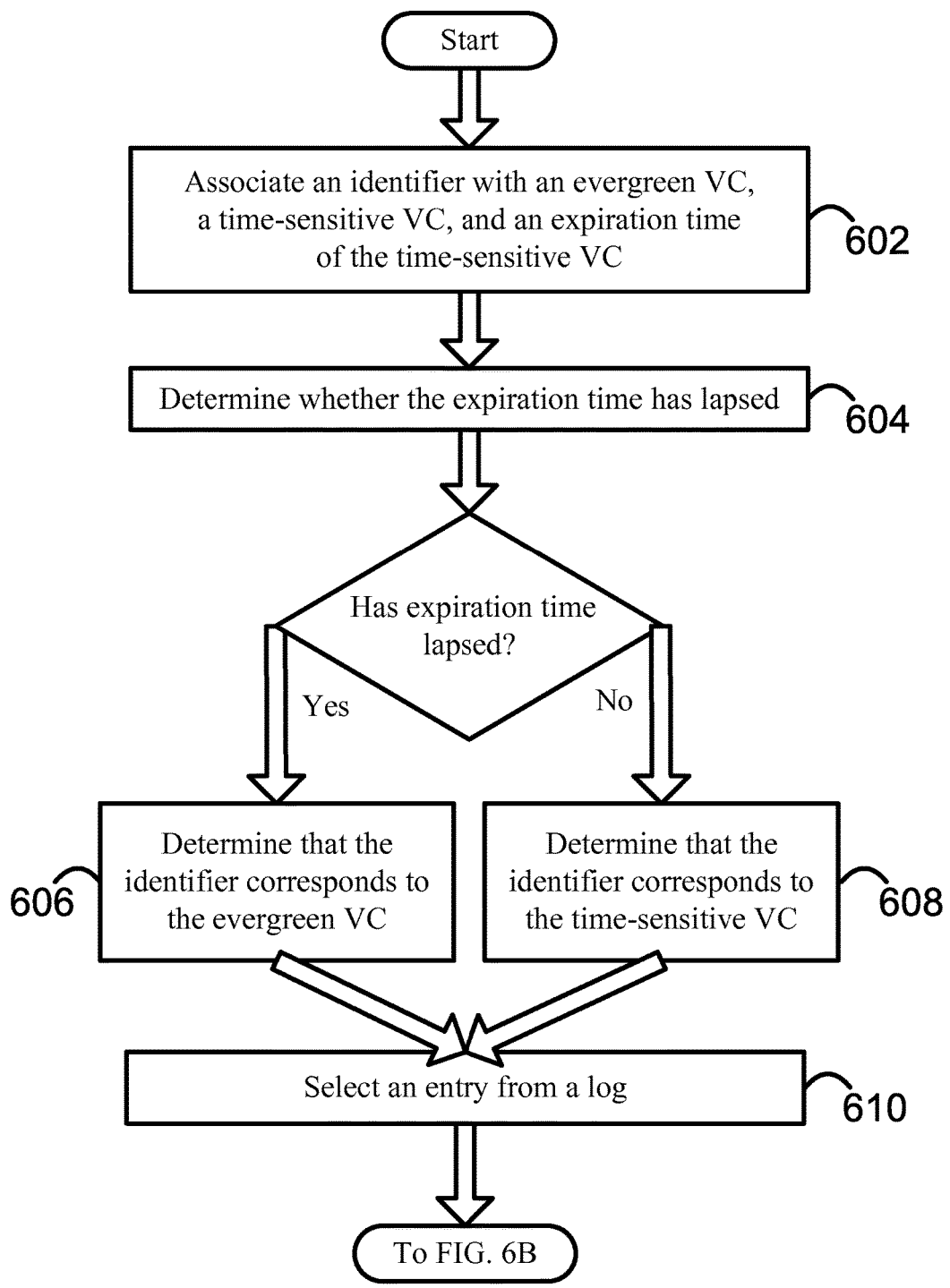
FIG. 6 (A and B) shows a flow chart illustrating functions in accordance with a first set of example methods.
Figure 6B:
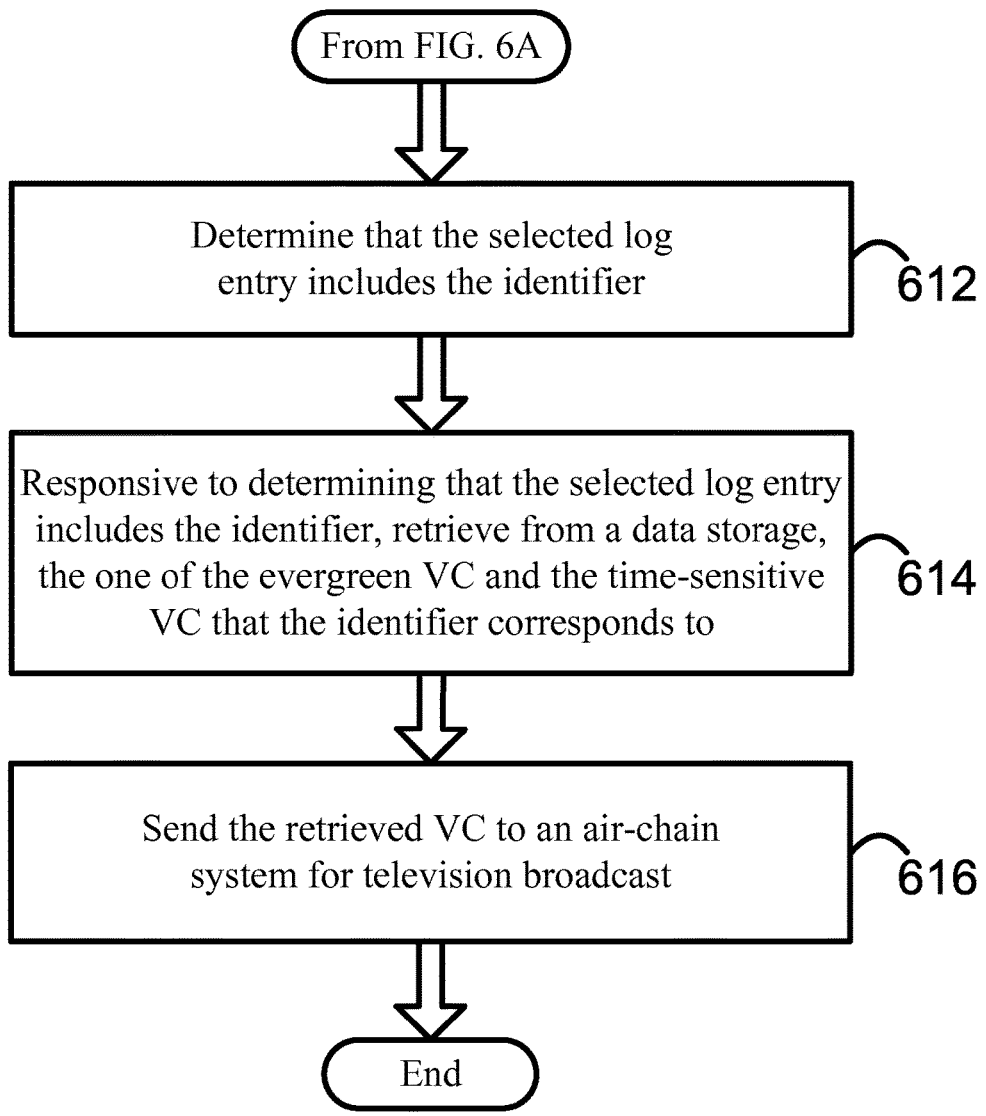

FIG. 6 shows a flow chart illustrating functions in accordance with a first set of example methods. At block 602, the method may involve the AS 408 associating an identifier with an evergreen VC, a time-sensitive VC, and an expiration time of the time-sensitive VC.

In one example, the AS 408 may receive the identifier, a selection of the evergreen VC, a selection of the time-sensitive VC, and the expiration time from a user via the user-interface 430. In one example, the AS 408 may present a set of evergreen VCs to a user in response to the user providing one or more search terms, and the user may then select an evergreen VC from that set. A user may select the time-sensitive VC in the same manner.

In one example, the expiration time represents the last possible time that the time-sensitive VC should logically be broadcast. For instance, if the time-sensitive VC is a news promotion that promotes a news program, the expiration time may be the start time or end time of the news program. The start time or end time may be included or calculated based on the scheduling data in the corresponding entry (e.g., the end time may be calculated by adding the duration to the start time).

For instance, consider an example log that contains an entry A and an entry B. The entry A includes a start time A and an identifier A that maps to a VC A. The entry B includes a start time B and an identifier B that maps to a VC B. The VC A is a news promotion that promotes the VC B, and the start time A is before the start time B. In this instance, the VC A is scheduled to air before the VC B, and therefore the expiration time of the VC A may be approximately the start time B.

In some instances, timing limitations of a time-sensitive VC may be even more granular. For example, a time-sensitive VC may be a news promotion that promotes a specific portion of a news program (e.g., the third show-segment), and therefore the expiration time of the news promotion may be the start time corresponding to the third show-segment VC.

As indicated in several of the examples throughout this disclosure, the expiration time may include not only a time of day, but also a specific date (e.g., an expiration time may be 3:00 pm EST on Tuesday, Mar. 6, 2012). However, in some instances, the expiration time may include a time with no specified date. Also, an expiration time as used in the presently disclosed system and method may not necessarily represent the last possible time that the time-sensitive VC should logically be broadcast. Indeed, in some instances, a user may provide an estimate of that last possible time or some other expiration time that the user deems appropriate. Further, in some examples the expiration time may be represented as an absolute time (e.g., at 3:00 PM EST on Mar. 6, 2012), while in other examples, it may be represented as a relative time (e.g., thirty minutes after the end time of a VC that corresponds to a particular log entry).

At block 604, the method may involve the AS 408 determining whether the expiration time has lapsed. Depending on whether the expiration time has lapsed, it may be determined whether the identifier corresponds to the evergreen VC or the time-sensitive VC. If it is determined that the expiration time has lapsed, at block 606, the method may involve the AS 408 determining that the identifier corresponds to the evergreen VC. If it is determined that the expiration time has not lapsed, at block 608, the method may involve the AS 408 determining that the identifier corresponds to the time-sensitive VC.

At block 610, the method may involve the AS 408 selecting an entry from a log. In one example, the AS 408 may select an entry from a log as the AS 408 traverses the log. As discussed above, the AS 408 may traverse entries of a log based on the scheduling data included in the log entries. As such, the selected log entry refers to a particular entry that is "current" in the traversal.

At block 612, the method may involve the AS 408 determining that the selected log entry includes the identifier (i.e., the identifier referenced in block 602). For instance, the AS 408 may determine that the identifier in a house-number field of the log entry has a predetermined prefix, that indicates that the identifier carries a special property, namely that it is associated with an evergreen VC, a time-sensitive VC, and an expiration time of the time-sensitive VC. Recall that an AS traditionally maps a house number to one specific VC, which is then retrieved and broadcast. However, the present system and method provides additional functionality such that an identifier in the house-number field may conditionally map to either an evergreen VC or a time-sensitive VC based on whether the expiration time of the time-sensitive VC has lapsed.

In one example, by determining that the identifier includes a predefined prefix, the AS 408 may compare the identifier to a list of identifiers carrying the special property. If a match is found, the AS 408 may determine that the selected log entry includes the identifier. If no match is found, the AS 408 may proceed on the basis that the identifier is a traditional house number and retrieve a corresponding VC as described in the background section above.

At block 614, the method may involve, responsive to the AS 408 determining that the selected log entry includes the identifier (i.e., the identifier referenced in block 602), retrieving from a data storage, the one of the evergreen VC and the time-sensitive VC that the identifier corresponds to. At block 616, the method may involve sending the retrieved VC to the air-chain system 500 for television broadcast. For example, the RAPS 300 may retrieve the one of the evergreen VC and the time-sensitive VC that the identifier corresponds to, and send it to MCS 300, which may in turn send it to the air-chain system 500.

IV. Second Set of Example Methods

Figure 7A:
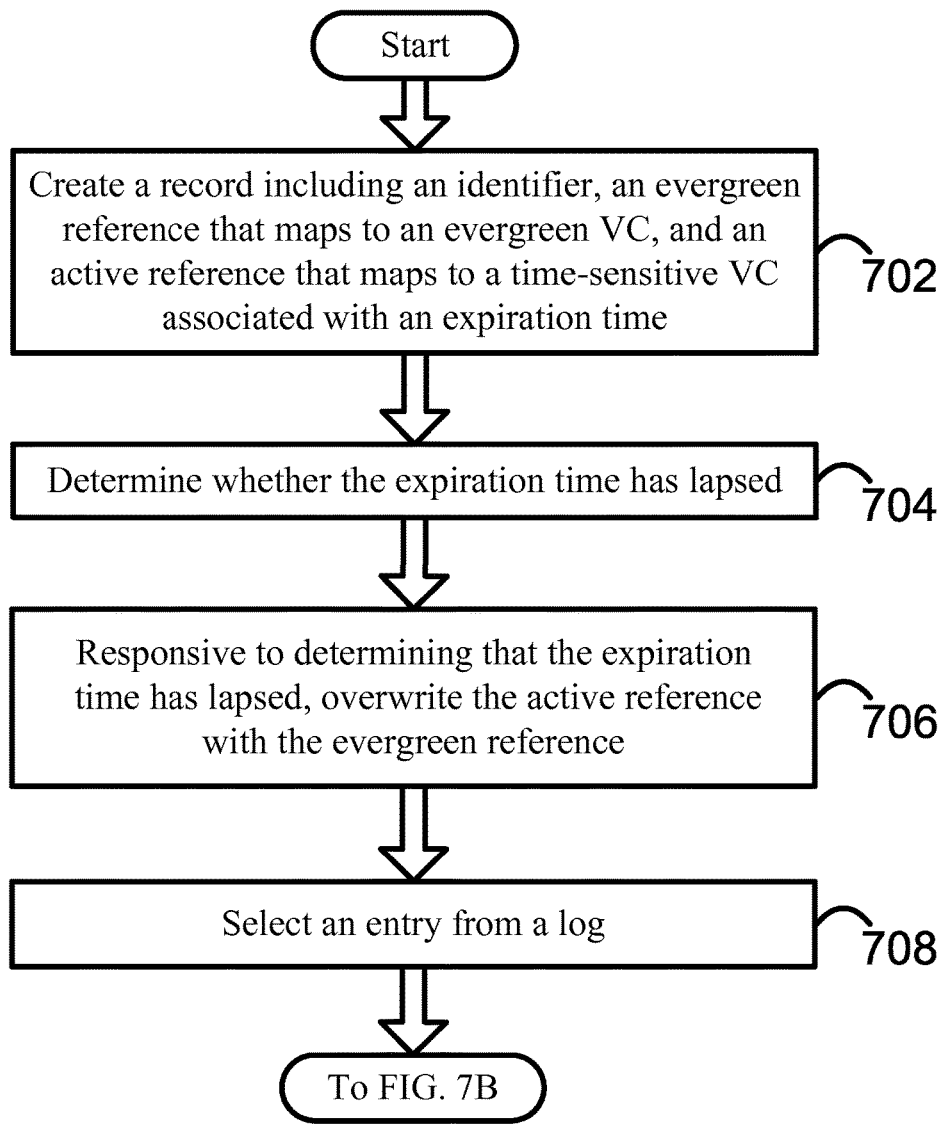
FIG. 7 (A and B) shows a flow chart illustrating functions in accordance with a second set of example methods.
Figure 7B:
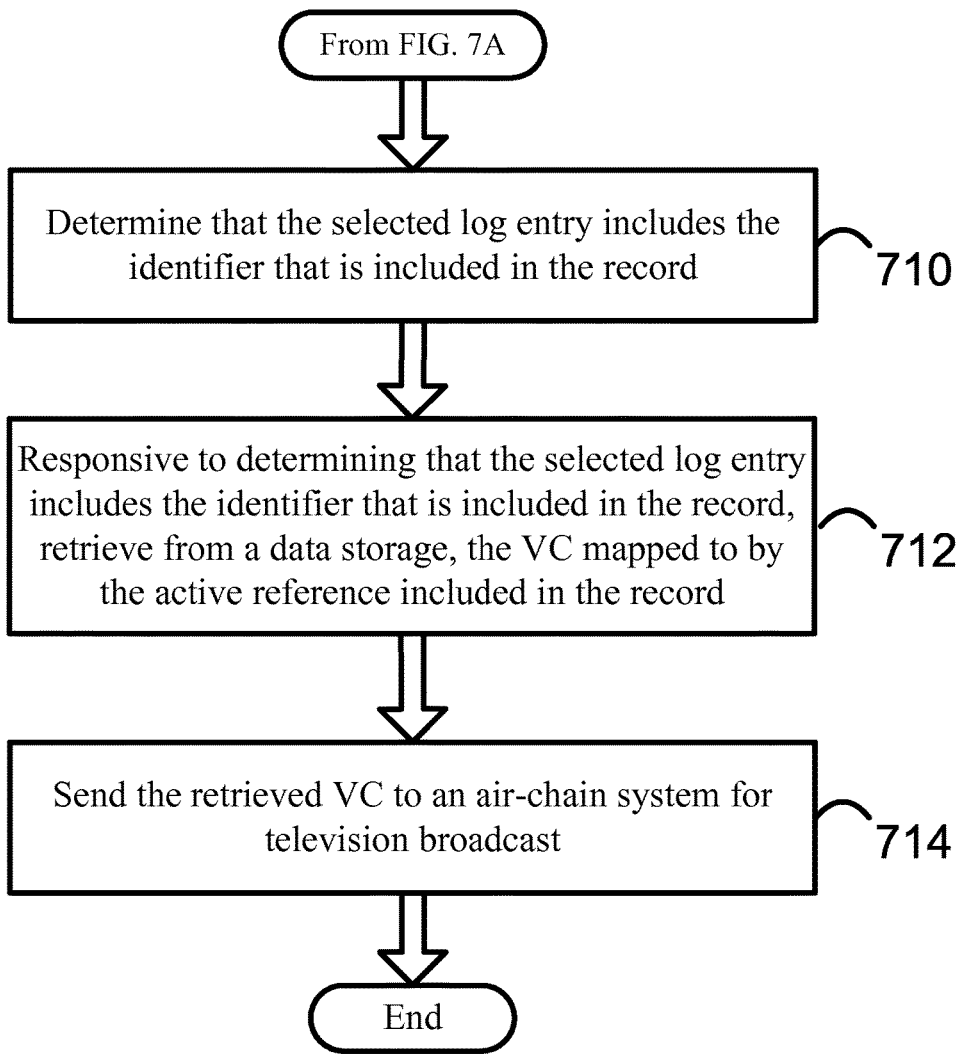

FIG. 7 shows a flow chart illustrating functions in accordance with a second set of example methods.

At block 702, the method may involve the AS 408 creating a record including (i) an identifier, (ii) an evergreen reference that maps to an evergreen VC, and (iii) an active reference that maps to a time-sensitive VC associated with an expiration time. In one example, the AS 408 may receive the identifier, a selection of the evergreen VC, a selection of the time-sensitive VC, and the expiration time from a user via the user-interface 430.

At block 704, the method may involve the AS 408 determining whether the expiration time has lapsed. In one example, determining whether the expiration time has lapsed may be based on a software interrupt event of the expiration time lapsing.

At block 706, the method may involve, responsive to the AS 408 determining that the expiration time has lapsed, the AS overwriting the active reference with the evergreen reference. At block 708, the method may involve the AS 408 selecting an entry from a log, and at block 710, the method may involve the AS 408 determining that the selected log entry includes the identifier that is included in the record.

At block 712, the method may involve, responsive to the AS 408 determining that the selected log entry includes the identifier that is included in the record, retrieving from the data storage 304, the VC mapped to by the active reference included in the record. Depending on the time in which the VC is retrieved from the data storage (i.e., the time in which the function at block 712 is performed), the active reference may map either to the evergreen VC or the time-sensitive VC. Indeed, should the VC be retrieved before the expiration time has lapsed, the active reference maps to the time-sensitive VC (as the function in block 706 has not been performed). On the other hand, should the VC be retrieved after the expiration time has lapsed, the active reference maps to the evergreen VC. This ensures that a time-sensitive VC is only retrieved while it is still logically appropriate to do so (i.e., before its associated expiration time has lapsed).

In block 714, the method may involve sending the retrieved VC to the air-chain system 500 for television broadcast. In one example, the RAPS 300 may retrieve the VC that the active reference maps to and send it to the air-chain system 500 via the MCS 300.

In one example, when the AS 408 creates the record, but is unable to determine which time-sensitive VC should be associated with the record (e.g., where a user has not selected one), the AS 408 may make the active reference map to the evergreen VC by default. The AS 408 may then revise the active reference when a time-sensitive VC (e.g., one selected by a user) is be associated with the record.

V. Example Variations

While examples have been provided where an identifier is associated with one time-sensitive VC, in some examples, the identifier may be associated with multiple time-sensitive VCs, each with a different expiration time. This may provide a cascading effect, where the identifier may correspond to one time-sensitive VC, but then when that time-sensitive VC expires, the identifier may correspond to a next time-sensitive VC. When the last time-sensitive VC expires, the identifier may correspond to the evergreen VC. The order in which time-sensitive VCs are selected (i.e., to corresponds to the identifier) may be based on a soonest corresponding expiration time or another ranking criteria. Accordingly, the disclosed method may be adapted for use with a first time-sensitive VC and a second time-sensitive VC (in place of the recited time-sensitive VC and the evergreen VC).

While examples have been provided where an evergreen-VC or a time-sensitive VC is retrieved based on a particular identifier in a log entry, namely an identifier in a house-number field, the identified may also be included in another field in the log entry (e.g., an auxiliary field) and may be used in the same manner.

While examples have been described in terms of VCs for use in a television-broadcasting environment, the presently disclosed system and method may also be adapted for use with other multi-user distribution environments, including for example, a radio-broadcasting environment. Like a television-broadcasting system, radio-broadcasting systems also include a traffic system (that also create traffic logs with entries having a house number in a house-number field), and other entities that parallel those in a television-broadcasting system. However, radio-broadcasting systems support audio but not video. Therefore, radio-broadcasting systems may be adapted for use with audio-components (AC) rather than VCs. As a result, select entities and/or functions and described throughout this disclosure may be adapted accordingly (e.g., an evergreen AC may be used instead of an evergreen VC). Notably, the term MC (and related terms, such as an evergreen MC) may refer to either an AC or a VC. In another example, the presently disclosed system and method may be adapted for use with an Internet-broadcasting environment (e.g., an environment in which MCs are broadcast over IP to end-user devices). The term broadcast as used in this disclosure also includes multicast.

While one or more functions of the presently disclosed method have been described as being performed by the certain entities (e.g., the AS 408), the functions may be performed by any entity, such as those included in the television-broadcasting system 100 described above. Further, the described steps throughout this application need not be performed in the disclosed order (e.g., as discussed above with respect to the timing of the VC being retrieved in block 712), although in some examples, an order may be preferred.

Also, not all steps need to be performed to achieve the desired advantages of the presently disclosed system and method, and therefore not all steps are required.

Further, while examples have been described in terms of select embodiments, alterations and permutations of these embodiments will be apparent to those of ordinary skill in the art. For example, the use of logical structures including loops and condition statements can be modified, interchanged, or restricted without departing from the presently disclosed system and method. Other changes, substitutions, and alterations are also possible without departing from the presently disclosed system and method in its broader aspects as set forth in the following claims.

The invention claimed is:

1. A non-transitory computer-readable medium containing instructions that, when executed by a processor, cause performance of a set of functions to facilitate operation of a television-broadcasting system comprising a master control system and an air-chain system, the set of functions comprising:

associating, by the master control system, an identifier with an evergreen video-component (VC), a time-sensitive VC, and an expiration time of the time-sensitive VC;

determining, by the master control system, whether the expiration time has lapsed;

based on the determination of whether the expiration time has lapsed, determining, by the master control system, that the identifier corresponds to a particular one of the evergreen VC and the time-sensitive VC, wherein if the determination is that the expiration time has lapsed, the master control system determines that the identifier corresponds to the evergreen VC and if the determination is that the expiration time has not lapsed, the master control system determines that the identifier corresponds to the time-sensitive VC;

selecting, by the master control system, a log entry from a television-broadcast traffic-log that specifies a sequence of video components scheduled to be broadcast by the master control system, wherein the selected log entry includes the identifier and a scheduled broadcast start-time;

retrieving, by the master control system, from a data storage, the one of the evergreen VC and the time-sensitive VC that the identifier in the selected log entry was determined to correspond to; and sending, by the master control system, the retrieved VC to the air-chain system for television broadcast, wherein the air-chain system is configured to (i) receive the VC, encode the received VC, and broadcast the encoded VC.

2. The computer-readable medium of claim 1, wherein based on the determination of whether the expiration time has lapsed, determining that the identifier corresponds to a particular one of the evergreen VC and the time-sensitive VC comprises based on a determination that the expiration time has lapsed, determining that the identifier corresponds to the evergreen VC.

3. The computer-readable medium of claim 1, wherein based on the determination of whether the expiration time has lapsed, determining that the identifier corresponds to a particular one of the evergreen VC and the time-sensitive VC comprises based on a determination that the expiration time has not lapsed, determining that the identifier corresponds to the time-sensitive VC.

4. The computer-readable medium of claim 1, wherein determining whether the expiration time has lapsed comprises determining whether the expiration time has lapsed based on a software interrupt event of the expiration time lapsing.

5. The computer-readable medium of claim 1, wherein the identifier is included in a house-number field in the selected log entry.

6. The computer-readable medium of claim 1, wherein the air-chain system comprises a transmitter, and wherein sending the retrieved VC to an air-chain system for television broadcast comprises sending the retrieved VC to the transmitter.

7. The computer-readable medium of claim 1, wherein the identifier is an identifier A, the selected log entry is a log entry A, and the log entry A further includes a start time A;
wherein the traffic-log further includes a log entry B, the log entry B includes an identifier B and a start time B, and the identifier B maps to a VC B; and
wherein the start time A precedes the start time B, the time-sensitive VC promotes the VC B, and the expiration time is approximately the start time B.

8. The computer-readable medium of claim 7, wherein the VC B is a news program.

9. A method to facilitate operation of a television-broadcasting system comprising a master control system and an air-chain system, the method comprising:
associating, by the master control system, an identifier with an evergreen video-component (VC), a time-sensitive VC, and an expiration time of the time-sensitive VC;
determining, by the master control system, whether the expiration time has lapsed;
based on the determination of whether the expiration time has lapsed, determining, by the master control system, that the identifier corresponds to a particular one of the evergreen VC and the time-sensitive VC, wherein if the determination is that the expiration time has lapsed, the master control system determines that the identifier corresponds to the evergreen VC and if the determination is that the expiration time has not lapsed, the master control system determines that the identifier corresponds to the time-sensitive VC;
selecting, by the master control system, a log entry from a television-broadcast traffic-log that specifies a sequence of video components scheduled to be broadcast by the master control system, wherein the selected log entry includes the identifier and a scheduled broadcast start-time;
retrieving, by the master control system, from a data storage, the one of the evergreen VC and the time-sensitive VC that the identifier in the selected log entry was determined to correspond to; and
sending, by the master control system, the retrieved VC to the air-chain system for television broadcast, wherein the air-chain system is configured to (i) receive the VC, encode the received VC, and broadcast the encoded VC.

10. The method of claim 9, wherein based on the determination of whether the expiration time has lapsed, determining that the identifier corresponds to a particular one of the evergreen VC and the time-sensitive VC comprises based on a determination that the expiration time has lapsed, determining that the identifier corresponds to the evergreen VC.

11. The method of claim 9, wherein based on the determination of whether the expiration time has lapsed, determining that the identifier corresponds to a particular one of the evergreen VC and the time-sensitive VC comprises based on a determination that the expiration time has not lapsed, determining that the identifier corresponds to the time-sensitive VC.

12. The method of claim 9, wherein determining whether the expiration time has lapsed comprises determining whether the expiration time has lapsed based on a software interrupt event of the expiration time lapsing.

13. The method of claim 9, wherein the identifier is included in a house-number field in the selected log entry.

14. The method of claim 9, wherein the air-chain system comprises a transmitter, and wherein sending the retrieved VC to an air-chain system for television broadcast comprises sending the retrieved VC to the transmitter.

15. The method of claim 9, wherein the identifier is an identifier A, the selected log entry is a log entry A, and the log entry A further includes a start time A;
wherein the traffic-log further includes a log entry B, the log entry B includes an identifier B and a start time B, and the identifier B maps to a VC B; and
wherein the start time A precedes the start time B, the time-sensitive VC promotes the VC B, and the expiration time is approximately the start time B.

16. The method of claim 15, wherein the VC B is a news program.

17. A method to facilitate operation of a television-broadcasting system comprising a master control system and an air-chain system, the method comprising:
determining, by the master control system, whether an expiration time of a time-sensitive video-component (VC) has lapsed;
based on the determination of whether the expiration time has lapsed, determining, by the master control system, that an identifier corresponds to a particular one of an evergreen VC and the time-sensitive VC, wherein if the determination is that the expiration time has lapsed, the master control system determines that the identifier corresponds to the evergreen VC and if the determination is that the expiration time has not lapsed, the master control system determines that the identifier corresponds to the time-sensitive VC;
selecting, by the master control system, a log entry from a television-broadcast traffic-log that specifies a sequence of video components scheduled to be broadcast by the master control system, wherein the selected log entry includes the identifier and a scheduled broadcast start-time;
retrieving, by the master control system, from a data storage, the one of the evergreen VC and the time-sensitive VC that the identifier in the selected log entry was determined to correspond to; and
sending, by the master control system, the retrieved VC to the air-chain system for television broadcast, wherein the air-chain system is configured to (i) receive the VC, encode the received VC, and broadcast the encoded VC.

18. The method of claim 17, wherein based on the determination of whether the expiration time has lapsed, determining that the identifier corresponds to a particular one of the evergreen VC and the time-sensitive VC comprises based on a determination that the expiration time has lapsed, determining that the identifier corresponds to the evergreen VC.

19. The method of claim 17, wherein based on the determination of whether the expiration time has lapsed, determining that the identifier corresponds to a particular one of the evergreen VC and the time-sensitive VC comprises based on a determination that the expiration time has not lapsed, determining that the identifier corresponds to the time-sensitive VC.

20. The method of claim 17, wherein the air-chain system comprises a transmitter, and wherein sending the retrieved VC to an air-chain system for television broadcast comprises sending the retrieved VC to the transmitter.

* * * * *